J. BACON.
Harvester Rake.
No. 50,529.
2 Sheets—Sheet 1.
Patented Oct. 17, 1865.
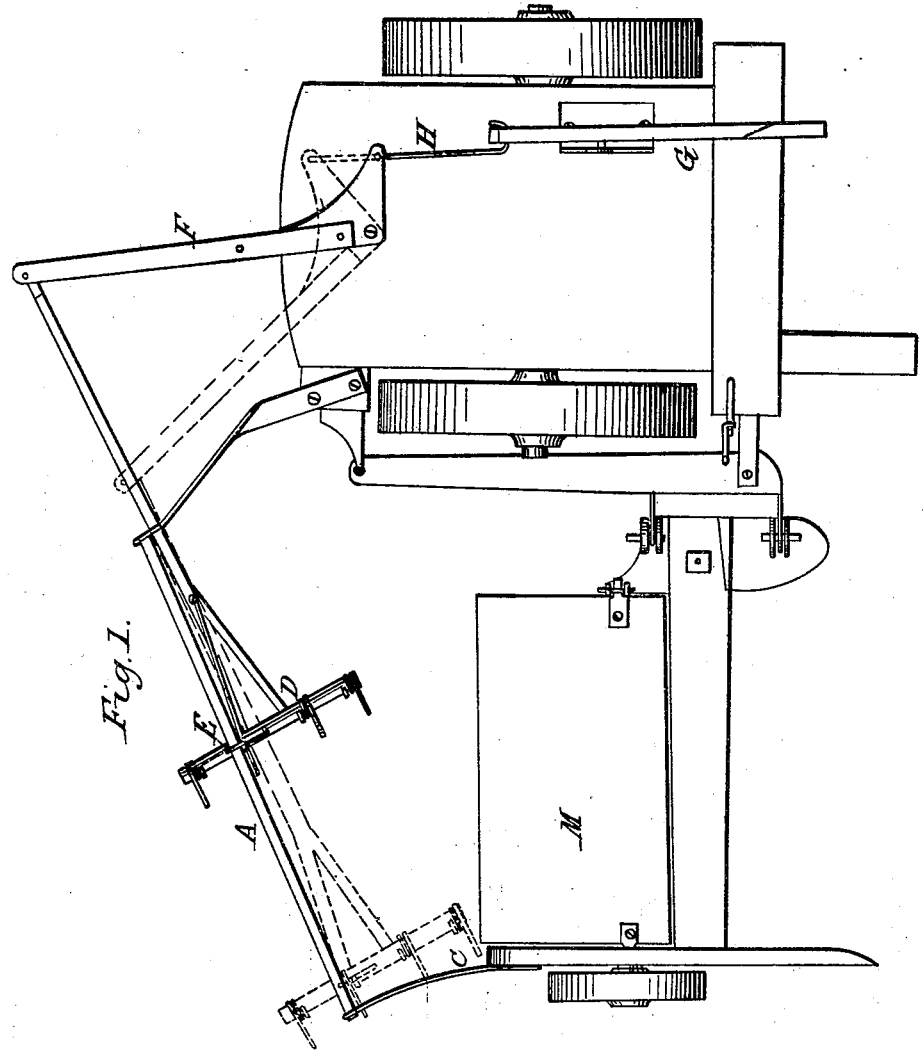

J. BACON.
Harvester Rake.
No. 50,529.
2 Sheets—Sheet 2.
Patented Oct. 17, 1865.
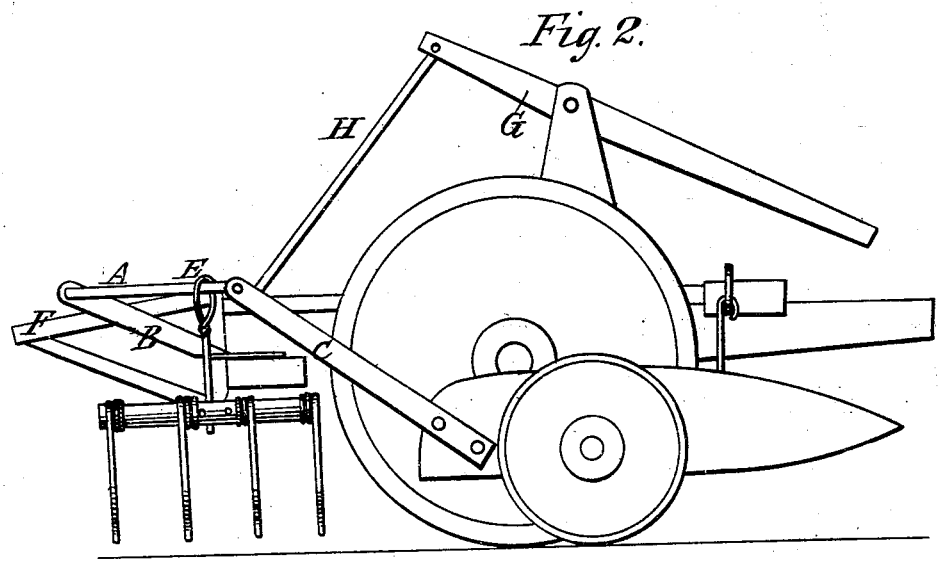
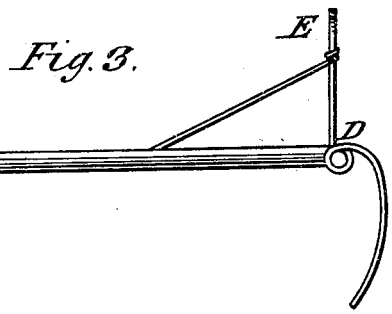
Witnesses:
Inventor:

UNITED STATES PATENT OFFICE.

JEROME BACON, OF MEDINA, WISCONSIN, ASSIGNOR TO HIMSELF AND JOHN F. SEIBERLING, OF DOYLESTOWN, OHIO.

IMPROVEMENT IN HARVESTER-RAKES.

Specification forming part of Letters Patent No. 50,529, dated October 17, 1865.

*To all whom it may concern:*

Be it known that I, JEROME BACON, of Medina, in the county of Outagamie and State of Wisconsin, have invented a new and useful Improvement in Automatic Brakes for Harvesters; and I do hereby declare that the following is a full and exact description thereof, reference being had to the accompanying drawings and to the letters of reference marked thereon.

My invention consists of a rake attached to the rear of a harvester for the purpose of removing the gavel after it has fallen from the platform, and thus clearing the track for the next turn of the team.

In the accompanying drawings, Figure 1 is a top view of my improved harvester. Fig. 2 is a side view of the same. Fig. 3 is a detached view of the rake.

The main portion of the machine may be of ordinary construction, with a dropping-platform, M, for depositing the gavel.

At the rear of the machine is a rod, A, supported on two arms, B and C. Under this rod A is a rake, D, suspended by means of a looped wire, E, the handle of the rake being attached to an elbow-lever, F. The form of the looped wire E is better seen in Figs. 2 and 3. The motion of the rake is indicated by red lines.

For operating the rake, a lever, G, is placed upon the main platform and connected to the elbow-lever F by means of a rod, H; but I do not confine myself to this mode of operating the rake, as that may be done by gearing or other means. The rod A is set obliquely across the track of the machine, so that the rake moves obliquely across the machine, traveling toward the rear as it carries the gavel to one side. This backward motion of the rake compensates for the forward motion of the machine, and thus the gavel is carried directly across the track of the cutters and the rake is prevented from tangling the grain. When the machine is put in operation the rake is set near the standing grain, as shown in red lines; and when the gavel falls the rake is moved to the other side, as seen in black lines. The velocity of the rake should vary with the speed of the team, so as always to travel directly across the track.

I am aware that rakes are in common use upon the platforms of harvesters, and therefore I do not claim these, but confine my invention to moving the gavel from the track.

Having thus fully described my invention, what I claim, and desire to secure by Letters Patent of the United States, is—

1. The use of a rake on the rear of a harvesting-machine for removing the gavel after it has fallen from the platform of the machine upon the ground, for the purpose of clearing a track for the next turn of the team, substantially as described.

2. The employment of the rake D, in combination with the tilting platform M, substantially as set forth.

3. The combination of the rake D, the supporting-rod A, the elbow-lever F, and the hand-lever G, substantially as described.

JEROME BACON.

Witnesses:
J. MOYER,
W. H. H. WROE.